WALTER HENNIG
HORST STREHLE
MANFRED WIESSNER
Inventors

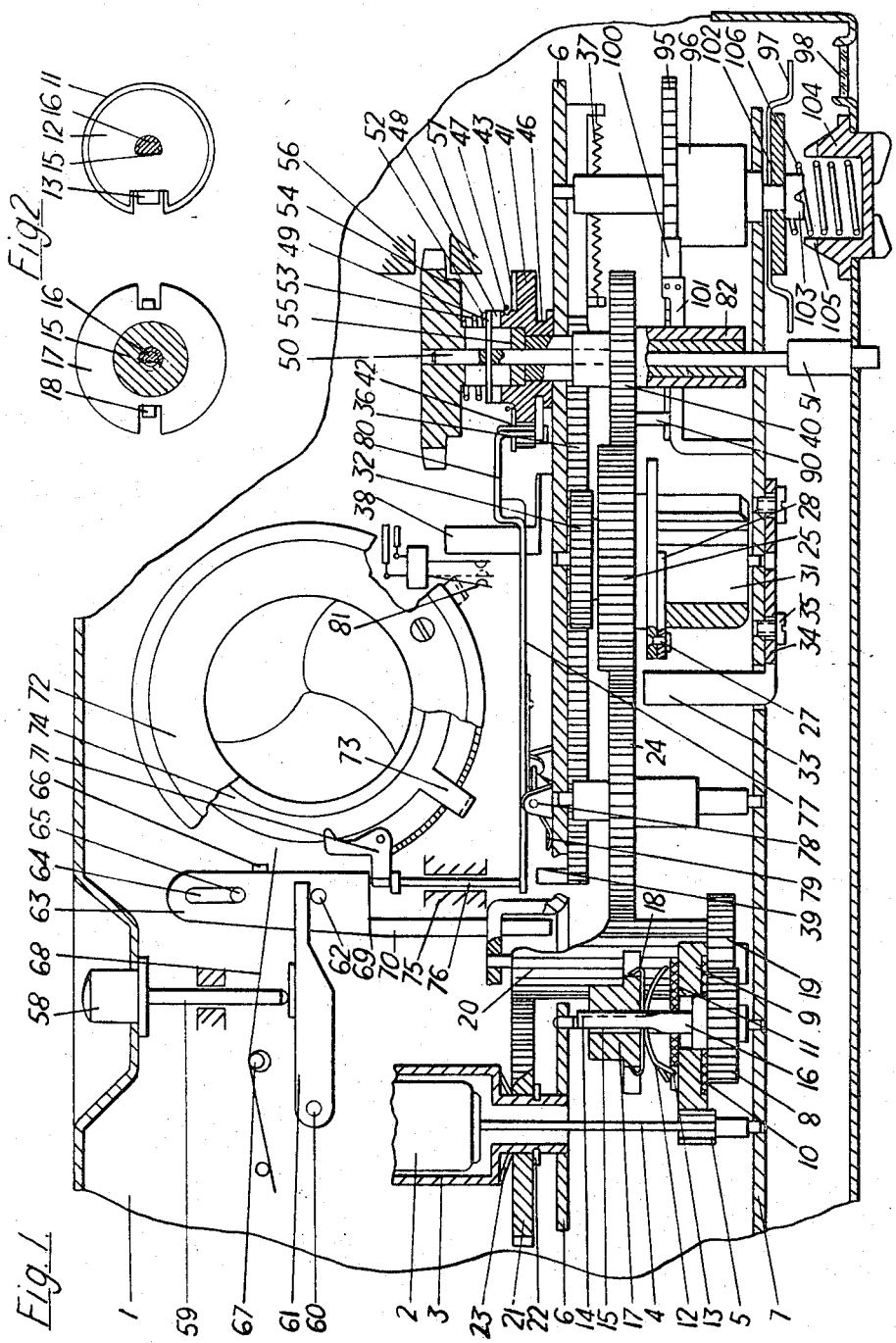

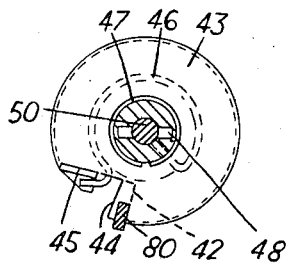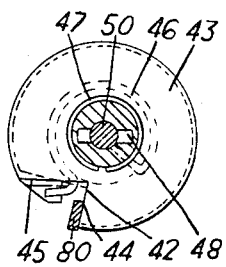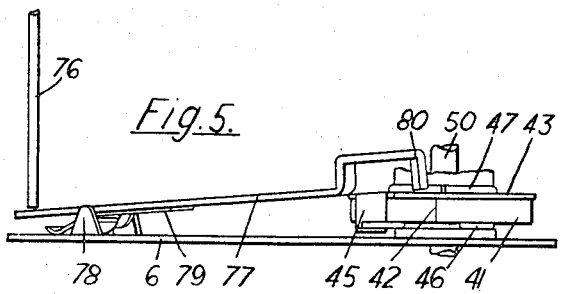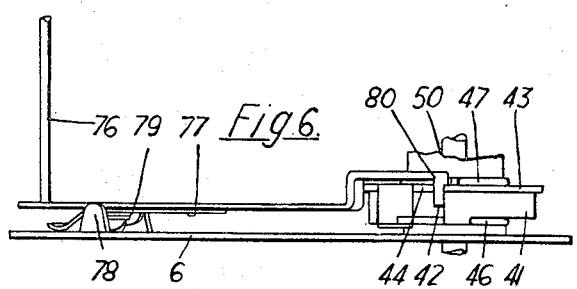

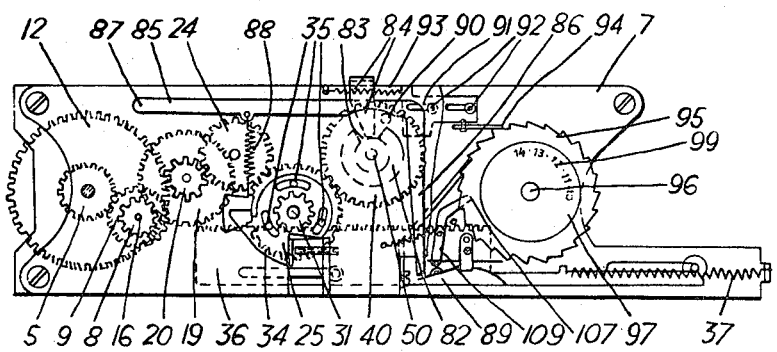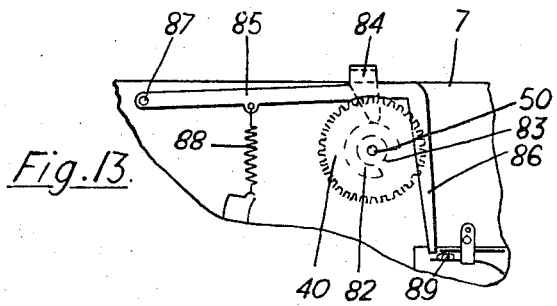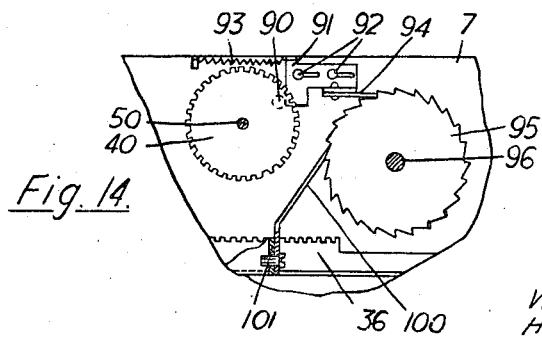

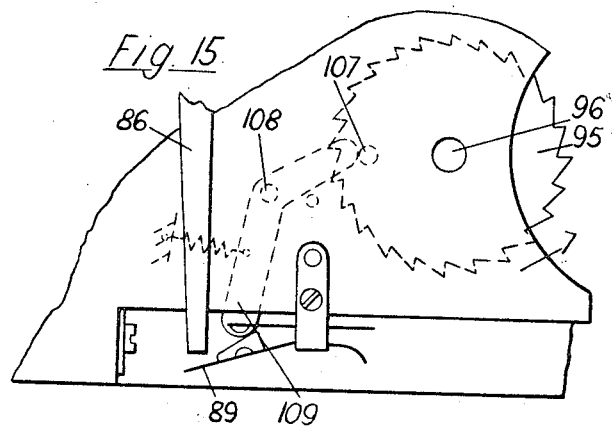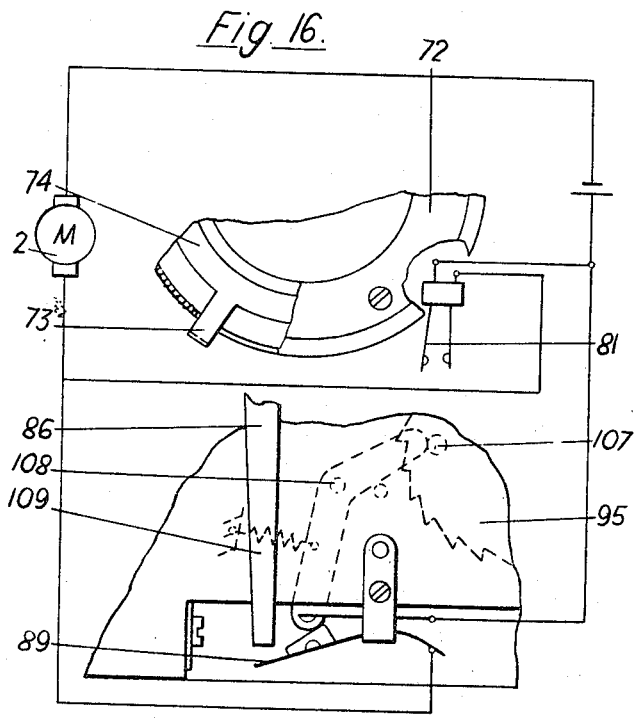

United States Patent Office 3,385,189
Patented May 28, 1968

3,385,189
PHOTOGRAPHIC CAMERA WITH AUTOMATIC FILM ADVANCE AND SHUTTER COCKING MEANS
Walter Hennig, Horst Strehle, and Manfred Wiessner, Dresden, Germany, assignors to Veb Kamera- und Kinowerke Dresden, Dresden, Germany
Continuation of application Ser. No. 454,765, Apr. 26, 1965, which is a continuation of application Ser. No. 254,300, Jan. 28, 1963. This application Sept. 30, 1966, Ser. No. 583,485
9 Claims. (Cl. 95—31)

ABSTRACT OF THE DISCLOSURE

A photographic camera has an electric motor for cocking the shutter and winding the film. The motor drives a film take-up spool through a reduction gear transmission. A friction coupling is interposed between the transmission and the spool so as to limit the torque that can be applied to the film. A film-transport sprocket can thus be positively blocked at the end of winding a frame, without undue transmission inertia being applied to the winding spool.

---

This is a continuation of application Ser. No. 454,765, filed Apr. 26, 1965, now abandoned, which is a continuation of application Ser. No. 254,300, filed Jan. 28, 1963, now abandoned.

The invention relates to a photographic camera with between-the-lens shutter, wherein the shutter cocking and film winding are actuated after the exposure of the film by means of an electric motor built into the camera.

Photographic cameras with between the-lens shutter and built-in electric motor are already known wherein the electric motor after the exposure of the film effects the shutter cocking and film winding. Here the electric motor on the one hand actuates the film take-up spool through a reduction gearing, and thus the film winding picture by picture, and on the other hand effects the shutter cocking by means of a combined crank and rack gearing coupled with the shutter cocking shaft, which gearing is blockable and releasable in the cocked position by a release arranged on the camera and co-operating with the gearing. The current connection for the electric motor is here controlled in such fashion that through a cam disc connected with the shutter cocking shaft, at the end of the running-off movement, through a contact the current connection for the electric motor is switched on and thereupon in the cocking movement, through a film-winding wheel driven by the film, by means of a cam disc, a second current contact is closed which after the shutter cocking and film winding have been effected interrupts the current connection again.

The arrangement of a combined crank and rack gearing releasable by the release from the cocked position and coupled with the shutter cocking shaft, delays and disadvantageously influences the chronological commencement and running-off of the shutter. The mass and acceleration forces occurring in combination with the fast-running electric motor and the gearing actuated thereby for the shutter cocking and film winding cannot be governed by the alternate control of the current interruption in such fashion that an exact film winding picture by picture is always ensured. Thus differences occur which can lead to irregular picture spacings and even to superimpositions of the pictures and thus to incorrect exposures.

In contrast to these photographic cameras above mentioned, a further known photographic camera having a between-the-lens shutter and a built-in electric motor for the shutter cocking and film winding is constructed so that the release arranged on the camera should directly release the between-the-lens shutter through its cocking ring for exposure and that the cocking ring at the end of the running-off of the shutter should close the current connection for the electric motor, through a contact, the motor thereupon actuating, through a common gearing, on the one hand the film take-up spool and film winding and on the other hand, through a crank rocker acting on the cocking ring, the shutter cocking, the cocking movement being released and blocked alternately by a blocking arrangement controllable by the release.

This latter proposal achieves the advantage that the crank rocker effecting the shutter cocking in no way disadvantageously influences the chronological beginning and running-off of the shutter. On the other hand in this further known embodiment difficulties occur because the mass and acceleration forces caused by the fast-running electric motor and the gearing actuated thereby for the shutter cocking and film winding, despite the alternate current interruption, have a disadvantageous effect upon the blocking arrangement actuated by the release. Finally it is common also to these above-mentioned known cameras that no blocking of the gearing actuated by the electric motor takes place after shutter cocking and film winding have been effected, if the release pressure is maintained, so that for the duration thereof the gearing actuated by the electric motor for the shutter cocking and film winding runs on without interruption despite the alternate current interruption. Incorrect exposures and empty pictures again are produced thereby.

An object of the present invention is to provide a photographic camera with between-the-lens shutter and built-in electric motor, by which the stated disadvantages of the known cameras are avoided.

In the following description the invention will be explained by reference to an example of embodiment which is illustrated diagrammatically in FIGURES 1–16. From these at the same time further features of the invention may be seen. Here the representation of all details which are not necessary for the explanation of the invention has been omitted.

FIGURE 1 shows a part of the photographic camera in section with the arrangements for release and the cocking of the shutter and film winding co-operating in accordance with the invention;

FIGURE 2 shows details of the friction coupling of the cocking gearing represented in FIGURE 1;

FIGURES 3–7 show partly in section, in plan view and in lateral elevation, details of the mechanism actuated by the release for the alternate blocking and release of the gearing for shutter cocking and film winding;

FIGURES 12 and 13 show in plan view details of the cocking gearing with the contact control of the current connection for the electric motor;

FIGURES 14 and 15 show in plan view the arrangement of a picture-counting mechanism actuated by the cocking gearing;

FIGURE 16 shows a circuit diagram of the contact control of the current connection for the electric motor.

Figure 7:
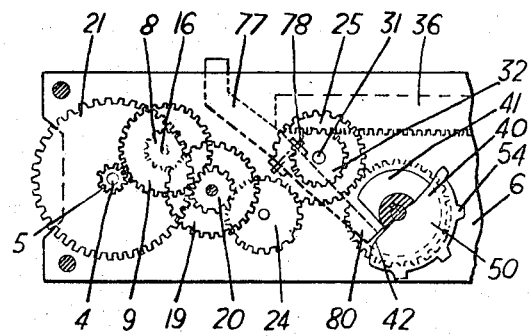
Figure 8:
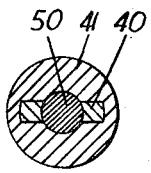
FIGURES 8 and 9 show in section and plan view a detail of the releasable coupling for the film winding wheel.
Figure 9:
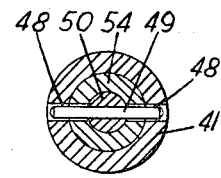
Figure 10:
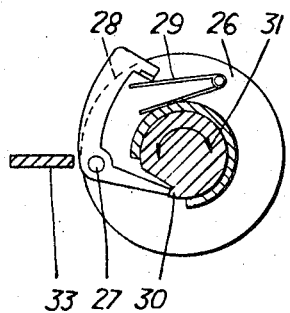
FIGURES 10 and 11 show, partly in section and plan view, as detail the releasable coupling of the rack gearing for the shutter cocking.

In FIGURE 1 an electric motor 2 is shown installed in the photographic camera 1, which motor receives its current from batteries also installed in the camera or through a main connection. The electric motor is connected to a shaft 4 extending through a film take-up spool 3. The shaft 4 carries a pinion 5 which is in mesh with a gear wheel 9 mounted on a further gear wheel 8 in such a manner that the wheels 8 and 9 can rotate relative to each other. The gear wheel 8, which is mounted on a spindle 16 carried at its ends in plates 6 and 7, is provided with friction discs 10, 11, made of a plastics material, located on each side of said wheel 9. Pressure is applied to the disc 11 by means of a domed spring plate 12 which is provided with a drive member 13 which engages a recess in the disc 11. The bore of the spring plate 12 is so shaped (see FIGURE 2) to fit the flat 15 provided on the spindle 16 that the spring plate rotates together with the spindle 16 but may move axially thereon. The spindle 16 has a threaded portion 14 which receives a ring nut 17 by which the pressure applied by the spring plate on the friction disc may be adjusted. A locking element 18 is provided, the ends of which engage in recesses in the nut 17. The locking element has a bore suitably shaped to slide over the threads of the spindle and to engage the flat 15 so that the locking element rotates with the spindle 16 and can move axially thereon when adjustment is effected.

The gear wheel 8 drives a gear wheel 19 and the toothed pinion 20 connected therewith. The toothed pinion 20 drives a gear wheel 21 rotatably mounted on the film take-up spool 3, which is mounted between a spring ring 22 and a spring plate 23 pressing against the film take-up spool 3. This plate here acts as friction coupling in such fashion that as the film winds onto the spool 3 the latter slips in relation to the toothed wheel 21, a uniform tensioning of the film being ensured and tearing thereof being prevented.

Figure 11:
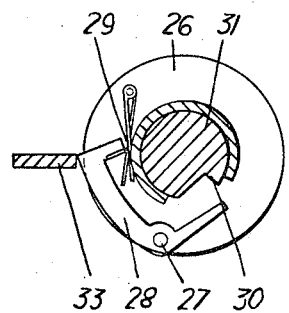

The toothed pinion 20 through a gear wheel 24 drives a gear wheel 25 for a rack drive which effects the shutter cocking. This rack drive, details of which may be seen from FIGURES 1, 10–12, consists essentially of the following parts:

With the gear wheel 25 there is firmly connected a disc 26 on which there is mounted a pawl 28 pivotable about a mounting rivet 27, which pawl has two arms. Against one arm there acts a spring 29 also arranged on the disc 26 and pressing the pawl 28 with its other arm into a groove 30, which is machined in a drive shaft 31 of a drive wheel 32 firmly connected therewith. The gear wheel 25 is mounted with its disc 26 and the pawl 28 arranged thereon together with the spring 29 in freely rotatable fashion about the drive shaft 31 and entrains the latter in the direction of the arrow shown in FIGURE 10 on rotation of the gearing actuated by the electric motor 2. At the end of this rotation the pawl 28 strikes with one arm against a stationary stop 33 and the pawl 28 is thereby uncoupled from the drive shaft 31, as shown in FIGURE 11. The stationary stop 33, which passes through an aperture in the plate 7, is connected with an adjusting disc 34 adjustable centrally in relation to the drive shaft 31 and securable on the plate 7 by means of screws 35.

The drive wheel 32 drives the rack 36 on the right end of which there is attached a return spring 37, which moves the rack 36 with the drive wheel 32 back into the initial position after uncoupling from the drive shaft 31. The rack 36 is guided on the plate 6 and possesses an angled-over stop 38 and at the left end a further stop 39. The stop 38 effects the shutter cocking and the stop 39 co-operates with the release arrangement, which will be explained more particularly hereinafter.

With the gear wheel 25 there is meshed another gear wheel 40 of the film winding gearing, mounted on the two plates 6, 7. The gear wheel 40, which is provided on both sides with collars, carries on the upper collar a blocking disc 41 which is illustrated more particularly in FIGURES 3–6. The disc 41 possesses a recess 42 and carries a further blocking disc 43 freely mounted centrally thereon, which also has a recess 44 with a downwardly angled stop 45. The latter passes through the recess 42 of the disc 41 and thus limits the rotational movement of the disc 43, which is connected through a spring 46 acting on its stop 45 with the disc 41. Here a spring ring 47 serves for the axial securing of the disc 41 and the disc 43.

The blocking disc 41 is provided on the upper collar with a transverse groove 48 in which there engages a coupling pin 49 which is firmly connected with a release rod 50, which can be shifted in the continuous bore of the drive wheel 40 axially by means of a release knob 51. On the coupling pin 49 there rests a disc 52 of a compression spring 53, which is supported by the film winding sprocket 54. The latter is rotatably mounted by means of its collar 55 in the disc 41 and can be uncoupled therefrom by pressure upon the release knob 50, for the purpose of winding the film back after the latter has been exposed. The film winding wheel 54 is here held by parts of the housing 56, 57 which partly grip round it on both sides.

The shutter release arrangement consists essentially of the release button 58, preferably arranged in countersunk fashion in the camera housing 1, which with its plunger 59 actuates an intermediate lever 61 pivotable about the mounting 60. The lever 61 acts upon a pin 62 of a slider 63 which is guided by means of a slot 64 by the fixed mounting pin 65 and possesses an angled-over projection 66 on which there rests a return spring 68 held by the bolt 67. This spring moves the slider 63, intermediate lever 61, the release 58, and the rod 59 together into the initial position. The slider 63 has a projection 69 and an extension 70. The projection 69 co-operates commonly on the one hand with a spring-loaded release pawl 71 of the between-the-lens shutter 72, which pawl releases the running-off of the shutter for the purpose of exposure through the cocking ring 74 provided with a cocking arm 73. The slider 63 also co-operates with a control rod 76 guided in the bearing 75, which rod actuates an operating lever 77 which is pivotable about a mounting member 78 fast with the housing and which is moved by the action of a spring 79 into the blocking position. The details of this blocking mechanism are shown in FIGURES 1, 5 and 6. The operating lever 77 possesses a blocking lug 80 angled-over downwards at the right end, which engages in the blocking position—as shown in FIGURES 1 and 6—in the aligned recesses 42, 44 of the discs 41 and 43 and thereby limits and blocks the rotation of the gearing actuated by the electric motor 2. In the released position, shown in FIGURE 5, the disc 43 springs due to the action of its spring 46 beneath the blocking lug 80, so that the latter with the operating lever 77 can only drop into the recesses 42, 44 again to block the rotating gearing shortly before the end of the effected cocking of the shutter and winding on of the film.

The extension 70 of the slider 63 co-operates with an angled-over stop 39 provided at the end of the rack 36, to bring the latter out of engagement with the release pawl 71 of the shutter 72 and the control rod 76 of the operating lever 77. Thus even on maintenance of release pressure upon the release member 58 after the cocking of the shutter and winding of the film have been effected, blocking of the shutter and of the cocking gearing takes place, so that the possibility of incorrect exposures and empty pictures is obviated. The released shutter 72 at the end of its running-off by means of the cocking arm 73 of the cocking ring 74 actuates a contact 81, whereby the current connection for the electric motor 2 is switched on.

On the lower collar of the gear wheel 40 there is arranged a sleeve 82 partly enclosing this collar, which grips on the collar by its own tension and has a recess 83 free. With the sleeve 82 there co-operates—as shown especially by FIGURES 12 and 13—a control lever 85 provided with a feeler 84 and having an angle arm 86, which lever is pivotable about the stationary mounting 87 and is pressed by the spring 88 so that the feeler 84 is urged against the sleeve 82. The control lever 85 with its angle arm 86 actuates a further contact 89 for the current connection for the electric motor 2. When the control lever 85 rests with its feeler 84 in the recess 83 of the sleeve 82, the contact 89—as shown in FIGURE 12—is interrupted. On the other hand as long as the control lever 85 rests with its feeler 84 on the periphery of the sleeve 82, as shown in FIGURE 13, the contact 89 is closed.

A control pin 90 is secured eccentrically on the drive wheel 40 and actuates a picture-counting mechanism. This consists essentially, as shown especially in FIGURES 1, 12, 14 and 15, of the operating slider 91 actuated by the rotating drive wheel 40 by means of the control pin 90, which slider is movable in slot guides 92 on the plate 7 and is moved back into the initial position by the spring 93. On the operating slider 91 there is secured a resilient conveyor 94, which co-operates with the ratchet wheel 95 which is firmly connected with the spindle 96 which is mounted in the two plates 6 and 7. With the spindle 96 there is further secured a picture-counting disc 97 possessing a depression, the edge of which disc carries the picture numbers 99 visible through the window 98. The ratchet teeth provided on the ratchet wheel 95 conform with the number of the picture numbers provided on the picture-counting disc 97 and with their spacing. With the teeth of the ratchet wheel 95 there further engages a blocking spring 100 which is secured on a housing part 101 and prevents turning back of the ratchet wheel 95 with the picture-counting disc 97. With the latter there is also secured a disc 102 produced from elastic material which lies in a depression of the picture-counting disc 97 and is held fast thereon by the screw 103.

Centrally of the picture-counting disc 97 on the bottom of the camera there is rotatably mounted an externally operable presser part 104, on which teeth 105 are provided internally and which is pressed by the compression spring 106 outwards against the camera bottom. On pressing in of the presser part 104 its teeth 105 engage with the elastic disc 102 and thus the picture-counting mechanism can be set to the desired picture number. The ratchet wheel 95, as shown in FIGURES 12 and 15, carries an operating pin 107 which co-operates with a contact lever 109 pivotable about the stationary mounting 108 and acting upon the contact 89. The operating pin 107 is so arranged on the ratchet wheel 95 that at a specific picture number, for example 36 exposures, it abuts against the contact lever 109 and through the latter interrupts the contact 89, so that the current connection for the electric motor 2 is automatically disconnected when the picture number is reached.

The manner of operation of the arrangement according to the invention in accordance with the explained example of embodiment is as follows:

Let us assume that the shutter cocking and film winding have been completed by the electric motor and thus the photographic camera is ready for picture taking. In this position the individual parts and functional groups assume the position as illustrated in FIGURES 1, 4, 6, 7, 10, 12 and 15.

Before the commencement of the photographic exposure the picture-counting mechanism is to be set to the desired number of exposures. This is effected due to the fact that the pressure part 104 illustrated in FIGURE 1 is pressed against the elastic disc 102 and thereupon by rotation of the presser part 104 the picture-counting mechanism is set to the desired picture number of the picture-counting disc 97 visible in the window 98. In this setting the operating pin 107 illustrated in FIGURE 12 and secured on the ratchet wheel 95 leaves the contact lever 109 and the latter thus releases the opened contact for closing the current connection. Closing thereof is however prevented at first by the angle arm 86 of the control lever 85, which holds the contact 109 fast in the opened position.

After the picture-counting mechanism has been set to the desired number of exposures, by actuation of the release knob 58 a photographic exposure can now be released. The plunger 59 operates the intermediate lever 61 which moves the slider 63 downwards against the action of the return spring 68, whereupon the projection 69 provided on the slider 63 effects both the release of the cocking ring 74 through the release pawl 71 and the cocking arm 73, and the movement of the operating lever 77, 80 out of the recesses 42, 44 of the discs 41 and 43 through the control rod 76. Thus the gearing for the shutter cocking and film winding is released ready for actuation by the electric motor 2. After the operating lever 77, 80 is moved out of the recesses 42, 44 of the discs 41 and 43, the latter springs beneath the blocking lug 80 of the operating lever 77 due to the action of the spring 46 and thereby for the present prevents the operating lever 77 from pivoting into the blocking position again. In this manner even on premature movement back of the release 58 or even on repeated actuation thereof through the operating lever 77, 80 no blocking action of the gearing can take place until the shutter has run off and the subsequent shutter cocking and film winding are completed.

After exposure has taken place at the end of the running off of the shutter the cocking ring 74 strikes with its cocking arm 73 against the contact 81 and thus closes the current connection for the electric motor 2, which then starts up and actuates the toothed wheel 9 mounted on the toothed wheel drive 8, by way of the shaft 4 and by means of the toothed pinion 5. The wheel 9 drives the gear wheel 8, so that the gear wheel 19 and the toothed pinion 20 are driven. The toothed pinion 20 on the one hand drives the film take-up spool 3 through the gear wheel 21 by means of the friction coupling 23, on the other hand the toothed pinion 20 through the gear wheel 24 drives the gear wheel 25 which actuates the rack by way of elements 26–32 and also the gear wheel 40 for the film winding mechanism. At the commencement of this cocking movement the sleeve 82 retained by the gear wheel 40 lifts the control lever 85 situated in the recess 83 and thereby closes the current connection, through the contact 89, for the electric motor 2 for the duration of the cocking movement. The pawl 28 arranged on the disc 26 of the gear wheel 25 engaging in the groove 30 of the drive shaft 31 drives the latter and this through the drive wheel 32 connected therewith actuates the rack 36. In the movement thereby effected the rack 36 firstly strikes with the stop 38 against the cocking arm 73 of the cocking ring 74 and transfers the latter into the position retained by the blocking pawl 71, whereby the between-the-lens shutter 72 is cocked. Before this position is reached the other stop 39 of the rack 36 strikes against the extension 70 of the release slider 63 and pivots the latter in such fashion that the projection 69 thereof is completely disengaged from the release pawl 71 and the control rod 76. The disengagement of the release slider 63, 69 from the release pawl 71 and the control rod 76 is timed in such a manner in relation to the movement of the cocking ring that before the end of the cocking movement the release pawl 71 can return into its blocking position.

The release arrangement is so constructed that the release slider 63 is disengaged from the release pawl 71 and the control rod 76 by the stop 39 of the rack 36 during the cocking movement, both in the initial position of the release knob 58 and also when the latter is depressed in the release position. Thus it is ensured that in every case in the cocking movement a disengagement of the release drive 63 takes place, irrespective of how long the release pressure upon the release knob 58 is maintained.

Shortly before the end of the shutter cocking and film winding the disc 41 coupled with the gear wheel 40 of the film winding sprocket 54 and the disc 43 have come with their recesses 42, 44 into the region of the blocking lug 80 of the operating lever 77, so that the latter can return into the blocking position due to the action of the spring 79. The recesses 42, 44 are made wider than the blocking lug 80, in order to obtain adequate free movement for the latter. At the end of the cocking movement of the shutter and the film winding the pawl 28 coupled with the drive wheel 25 strikes with one arm against the stationary stop 33 and the pawl 28 is thereby uncoupled from the drive shaft 31, which thereupon returns into the initial position with the toothed wheel 32 and the rack 36 due to the action of the return spring 37 connected therewith. At the same time at the end of the cocking movement of the shutter and the film winding the control lever 85 lifted during this movement by the sleeve 82 drops with its feeler 84 due to the action of the spring 88 into the recess 83 of the sleeve 82 and in doing so through the contact 89 interrupts the current connection for the electric motor 2 which is thereby switched off. The electric motor 2 and the gearing actuated by it come to an immediate standstill. Due to the inertia and acceleration forces caused in rotation, both the motor 2 and also the gearing uncoupled from the rack drive 32, 36 which actuates the film take-up spool 3 and the film winding continue to run on. The differences in the amount of film wound on in each operation of the camera, which would have the effect especially of an inaccurate picture spacing, are prevented in the present invention by the fact that the running down of the gearing is limited exactly by the blocking lug 80 of the operating lever 77 engaging in the recess 42 of the disc 41 and at the same time the energy still present in the running-down gearing is taken up and finally absorbed by the friction coupling 10–12 associated in the cocking gearing with the gear wheel 8. Since this friction coupling is constantly effective and is regulatable as regards its braking action by the ring nut 17, a constant braking action is always ensured. Thus in co-operation with the operating lever 77, 80 limiting the rotation of the cocking gearing a constantly exact picture spacing is achieved and due to the simultaneously effective constant braking action of the friction coupling 10–12 the blocking impacts occurring in the limitation of the operating movement upon the gearing are substantially reduced. The manner of operation here set forth takes place on every release of a photographic exposure, until the number of pictures set by the picture-counting mechanism is reached. Then the operating pin 107 secured on the ratchet wheel 95 strikes against the contact lever 109 and moves the latter in such fashion that the contact 89 already opened by the control lever 85 by means of its angle arm 86 is additionally locked in the opening position. Thus the contact effecting current interruption for the electric motor 2 is locked open until the photographic camera is set to a fresh picture number by the picture-counting mechanism by actuation of the presser part 104. The construction of the picture-counting mechanism enables setting to any desired picture number provided on the picture-counting disc 97 to be made, and after the number of photographic exposures set thereon have been made, the current interruption for the electric motor 2 is automatically locked.

According to the explained example of embodiment the locking open of the contact 89 effecting current interruption for the electric motor 2 by the picture-counting mechanism through the rachet wheel 95 takes place at the end of the shutter cocking and film winding operation. Where arrangements affecting the setting of the shutter are provided, for example an exposure meter device coupled with exposure time and aperture diaphragm setting members, it may be desired that the contact in circuit with the electric motor be locked open by the picture-counting mechanism after the elapse of the set number of pictures not at the end of the shutter cocking and film winding but at the beginning thereof or at a moment lying between the beginning and the end of the shutter cocking. Such a setting of the picture-counting mechanism is provided in accordance with the invention due to the fact that with maintenance of the moment of the control of the contact 89 effected through the sleeve 82 and the control lever 85, in contrast thereto the operating wheel 40 with the control pin 90 secured thereon is so adjusted by shifting into another tooth engagement of the drive wheel 25 that then for example the operating slider 91 actuated by the control pin 90 of the operating wheel 40 controls the ratchet wheel 95 in such fashion that the operating pin 107 thereof then effects the current interruption for the electric motor 2 not at the end of the shutter cocking and film winding but at the beginning thereof or at another moment lying between the beginning and the end of the shutter cocking and film winding, through the contact lever 108 and contact 89.

Thus by the arrangement in accordance with the invention of the sleeve 82 mounted by means of its own tension on the drive wheel 40, in combination with the control lever 85, 86, co-operating therewith and the picture-counting mechanism controlled by the drive wheel 40 thorough the operating pin 107, the possibility is provided that both the moment for interruption of the current connection for the gearing actuated by the electric motor 2 after every effected shutter cocking and film winding and also the moment of the interruption of the current connection for the electric motor 2 effected by the picture-counting mechanism can be adjusted according to requirements in each case.

According to the explained example of embodiment the disengagement of the slider 63, actuated by the release knob 58, and control rod 59, from the release pawl 71 of the shutter 72 and the operating rod 76 of the operating lever 77 is effected by the rack drive 36, 39 actuated by the electric motor 2. This disengagement of the slider 63 may alternatively take place in dependence upon and in combination with a drive wheel of the gearing actuated by the electric motor 2 or through the shutter 72 itself, for example through the correspondingly extended cocking arm 73 of the cocking ring 74.

Having described our invention, we claim:

1. A photographic camera having a shutter and an electric motor for effecting shutter cocking and film winding, said shutter having a cocking ring movable between a first position in which the shutter is cocked ready for an exposure to be made and a second position at which said cocking ring arrives after running off, a release pawl mounted for movement in said camera and adapted to retain said cocking ring in said first position, release mechanism operatively connected to said release pawl for actuating the latter, a drive member in said camera for moving said cocking ring from its said second position to its said first position, transmission means drivingly interconnecting the electric motor and said drive member, said transmission means including a first friction coupling, a film take-up spool within said camera, a second friction coupling drivingly connecting at least a portion of said transmission means and said spool, a film transport sprocket connected to said transmission means for film wind-on and disengageable therefrom for film rewind, blocking disc means operatively connected to said procket, a lever pivotally mounted in said camera and having a portion engageable within a recess provided in said blocking disc means thereby positively to terminate rotation of said sprocket at a predetermined position at the end of a film winding-on operation, said lever being operatively connected to said release mechanism to effect release of said blocking disc means on actuation of said release mechanism, means operable by said transmission means for effecting disengagement of said operative connection between said release mechanism and said release pawl and between said release mechanism and said lever as the cocking ring reaches its said second position to permit cocking of said cocking ring and blocking of said disc means, a first switch in the circuit of said motor operable by said cocking ring in its said second position to initiate operation of said motor and consequently the commencement of the cocking of said cocking ring, a second switch in the circuit of the motor connected in parallel with said first switch, and a switch actuator for actuating said second switch, said switch actuator being actuated by said transmission means to close said second switch after commencement of the cocking movement and to open said second switch when the cocking ring arrives in its said first position.

2. A camera as claimed in claim 1, wherein said means operable by said transmission means for effecting disengagement of said operative connection comprises means provided on said drive member.

3. A camera as claimed in claim 1, in which said release mechanism comprises a pivot pin fixed within the camera, and a slider having a slot within which said pivot pin is disposed, said slider being adapted to slide on said pin to engage said pawl and to effect said movement of said pawl for releasing the cocking ring and to pivot on said pin out of engagement with said pawl, said lever being operatively connected to said slider to effect release of said blocking disc means on actuation of said slider, and said means operable by said transmission means for effecting disengagement of said operative connection comprising means provided on said drive member for pivoting said slider to effect disengagement of said slider from said release pawl and disengagement of said operative connection between said slider and said lever.

4. A camera as claimed in claim 1, in which said blocking disc means comprises a first blocking disc operatively connected to said sprocket, said lever having a bent-over portion movable axially of said first blocking disc and engageable within a recess provided on the circumference of said first blocking disc, and a second blocking disc concentrical with said first blocking disc and arranged to prevent entry of said bent-over portion into the recess after the bent-over portion leaves the recess on release of said shutter and to permit reentry of said bent-over portion into said recess after the film winding operation has been completed.

5. A camera as claimed in claim 1, and a shaft connected to said sprocket having a recess on its circumference, and a switch lever for actuating said second switch, said switch lever having an arm which engages the circumference of said shaft and which maintains said switch lever in position to close said second switch after commencement of the cocking movement and which engages a recess in said shaft to open said second switch when the cocking ring arrives at its said second position.

6. A camera as claimed in claim 5, and settable exposure counting mechanism in said camera including a ratchet wheel rotatable step-by-step by said transmission means, and a projection connected to said ratchet wheel and engageable with said switch lever on the completion of a predetermined number of exposures to move the switch lever into a position in which said second switch remains open until the ratchet wheel is reset.

7. A camera as claimed in claim 6, including a spindle on which is mounted said ratchet wheel, an exposure number indicator mounted on said spindle, a first coupling element attached to an end of said spindle, a manually depressible member concentric with said spindle and movable axially in relation thereto, and a second coupling element cooperable with said first coupling element on the depression of said depressible member whereby said spindle is rotatable for the purpose of presetting the number of exposures possible with the film used.

8. A camera as claimed in claim 1, wherein said first friction coupling is provided with screw means for adjustment of the friction drive through said first coupling.

9. A camera as claimed in claim 1, wherein said transmission means includes a train of gear wheels, and said first friction coupling comprises a rotatable spindle having one of said gear wheels fixed thereto and another freely rotatable with respect to said spindle, a first friction disc provided between the two mentioned gear wheels, a threaded portion on said spindle, an adjustable nut on said threaded portion, a second friction disc in engagement with said freely rotatable gear wheel on the side thereof remote from said first friction disc, and a domed spring element located between said second friction disc and said nut to impart a force to hold said friction discs and said freely rotatable wheel in frictional engagement with each other.

References Cited

UNITED STATES PATENTS

| | | | |
|---|---|---|---|
| 2,091,526 | 8/1937 | Sachtleben | 226—144 X |
| 2,633,773 | 4/1953 | Frederick | 226—144 |
| 2,868,099 | 1/1959 | Weiss | 95—31 |
| 2,969,722 | 1/1961 | Schwartz | 95—31 |
| 3,057,280 | 10/1962 | Weise et al. | 95—64 |
| 3,098,418 | 7/1963 | Reiher et al. | 95—31 |
| 3,126,803 | 3/1964 | Hintze | 95—31 |
| 3,135,182 | 6/1964 | Hintze et al. | 95—31 |

FOREIGN PATENTS

| | | |
|---|---|---|
| 1,303,839 | 6/1962 | France. |
| 1,013,433 | 12/1965 | Great Britain. |

NORTON ANSHER, *Primary Examiner.*

JOHN M. HORAN, *Examiner.*

J. F. PETERS, Jr., *Assistant Examiner.*